United States Patent
Aksu et al.

(10) Patent No.: US 9,456,290 B2
(45) Date of Patent: Sep. 27, 2016

(54) INSTALLATION OF A VOICE CLIENT FOR ROAMING DEVICES IN A WIRELESS NETWORK

(71) Applicants: Verizon Patent and Licensing Inc., Arlington, VA (US); Cellco Partnership, Arlington, VA (US)

(72) Inventors: Arda Aksu, Martinez, CA (US); Priscilla Lau, Fremont, CA (US); Steven R. Rados, Danville, CA (US); Lalit R. Kotecha, San Ramon, CA (US); Patricia R. Chang, San Ramon, CA (US); Sagiv Draznin, Walnut Creek, CA (US); David Chiang, Fremont, CA (US); John F. Macias, Antelope, CA (US); Sanyogita Shamsunder, Basking Ridge, NJ (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 221 days.

(21) Appl. No.: 13/907,840

(22) Filed: May 31, 2013

(65) Prior Publication Data

US 2014/0185521 A1    Jul. 3, 2014

Related U.S. Application Data

(63) Continuation-in-part of application No. 13/730,041, filed on Dec. 28, 2012, now abandoned.

(51) Int. Cl.
*H04W 4/00* (2009.01)
*H04W 8/02* (2009.01)

(52) U.S. Cl.
CPC .............. *H04W 4/001* (2013.01); *H04W 8/02* (2013.01)

(58) Field of Classification Search
CPC ....... H04W 4/001; H04W 8/02; H04W 8/06; H04W 8/12
See application file for complete search history.

(56) References Cited

U.S. PATENT DOCUMENTS

| | | | |
|---|---|---|---|
| 8,725,114 B2 | 5/2014 | Syal et al. | |
| 8,805,323 B2 | 8/2014 | Ramprasad et al. | |
| 2007/0047523 A1* | 3/2007 | Jiang | H04M 3/02 370/352 |
| 2008/0153482 A1* | 6/2008 | Kongalath | H04W 8/06 455/432.1 |
| 2012/0196655 A1 | 8/2012 | Fischer | |
| 2012/0275442 A1* | 11/2012 | Malets | H04W 4/16 370/338 |
| 2013/0010752 A1 | 1/2013 | Rydnell et al. | |
| 2013/0029637 A1* | 1/2013 | Hillier | H04W 8/26 455/411 |
| 2014/0007083 A1 | 1/2014 | Baldwin et al. | |
| 2014/0162676 A1 | 6/2014 | Shaw | |
| 2015/0113044 A1 | 4/2015 | Noldus | |

* cited by examiner

*Primary Examiner* — David Oveissi (57) ABSTRACT

Voice over LTE (VoLTE) services may be provided to a roaming mobile device, even when the home network of the mobile device does not provide VoLTE service. In one implementation, one or more devices in a network may determine based on a mobile device attaching to a network as a roaming device for the network, a home network of the mobile device. The devices may further determine whether the home network, associated with the mobile device, provides VoLTE services; transmit, based on the determination that the home network does not provide VoLTE services, a VoLTE client application to the mobile device, the VoLTE client application providing functionality, for the mobile device, relating to usage of VoLTE services in the network. The devices may further communicate with the mobile device and the VoLTE client application, to provide one or more VoLTE services to the mobile device.

20 Claims, 9 Drawing Sheets

INSTALLATION OF A VOICE CLIENT FOR ROAMING DEVICES IN A WIRELESS NETWORK

RELATED APPLICATIONS

This application claims priority from and is a continuation-in-part (CIP) of U.S. patent application Ser. No. 13/730,041, filed Dec. 28, 2012, entitled "INSTALLATION OF A VOICE CLIENT FOR ROAMING DEVICES IN A WIRELESS NETWORK."

BACKGROUND

The Long Term Evolution (LTE) standard is a standard for wireless communication of high-speed data for mobile devices and data terminals. LTE is based on the GSM/EDGE (Global System for Mobile Communications/Enhanced Data rates for GSM Evolution) and UMTS/HSPA (Universal Mobile Telecommunications System/High Speed Packet Access) network technologies. Relative to GSM/EDGE and UMTS/HSPA, LTE may increase the capacity and speed of the wireless network based on improvements to the radio interface and improvements to the core network.

The LTE standard is based on packet switched IP networking and does not have inherent support for circuit-switched voice calls. Some telecommunications providers, when implementing the LTE standard, use the LTE network for data transmission while continuing to use other network standards/technologies, such as GSM or UMTS to handle voice calls. A number of approaches, however, have been developed to provide voice over LTE. One such approach is the Voice Over LTE (VoLTE) standard.

DETAILED DESCRIPTION OF PREFERRED EMBODIMENTS

The following detailed description refers to the accompanying drawings. The same reference numbers in different drawings may identify the same or similar elements.

Techniques described herein may provide VoLTE service to a roaming mobile device, that attaches to an LTE network, even when the home network of the mobile device does not provide VoLTE service. The roaming mobile device may receive a VoLTE client application, such as an downloadable application, from the VoLTE-enabled LTE network. The VoLTE client application may enable the mobile device to subsequently place telephone calls, through the roaming network, using VoLTE.

Figure 1:
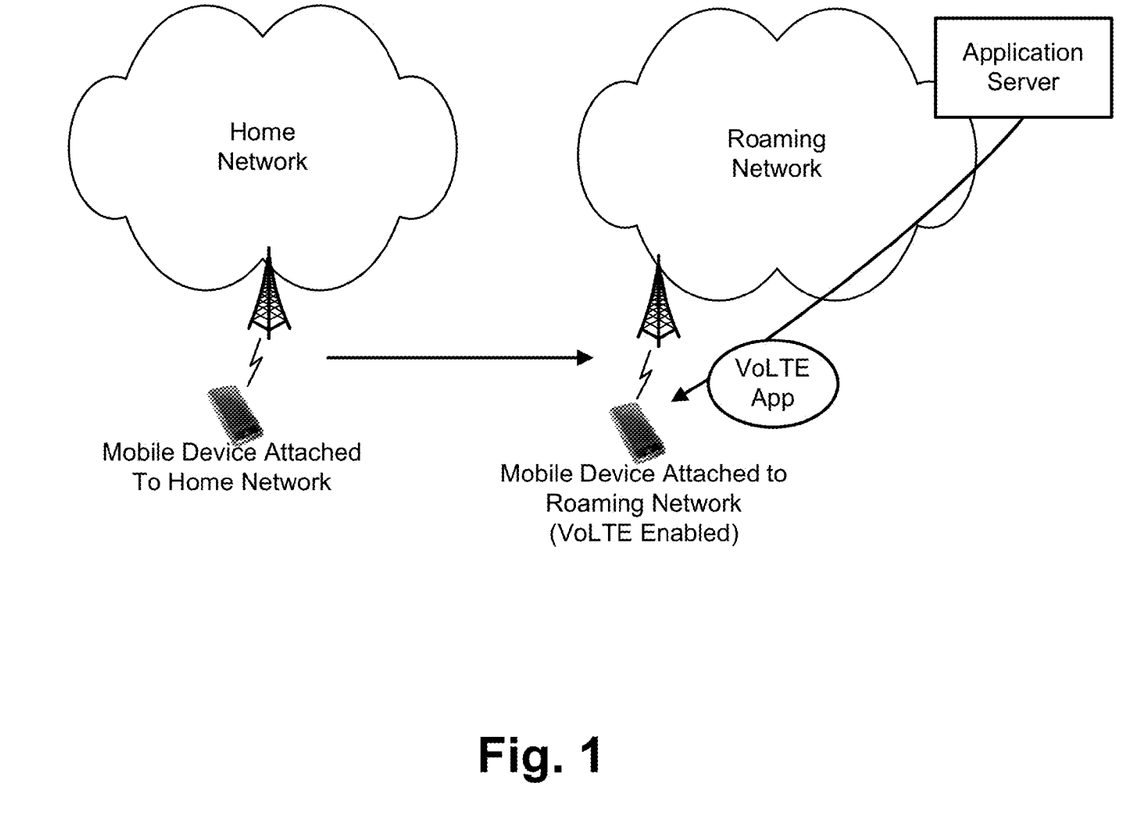
FIG. 1 is a diagram conceptually illustrating an example of an overview of concepts described herein.

FIG. 1 is a diagram conceptually illustrating an example of an overview of concepts described herein. As shown in FIG. 1, user equipment (UE), such as a mobile device, may be associated with a home network (i.e., a wireless network maintained by a telecommunications operator of which the user of the mobile device is a customer). The home network may be a network that does not include support for voice calls made using VoLTE. For instance, voice calls in the home network may be implemented using circuit switched technologies.

At some point, the mobile device may roam, which may refer to the mobile device being powered on in a geographical area in which there are no base stations, associated with the home network of the mobile device, within radio range. This may be the case, for example, when the user of the mobile device travels to an area outside of the geographical range of the home network (e.g., to a different country). The mobile device may, however, connect to another network (the roaming network). The roaming network may be a network in which the operator of the home network (e.g., a first telecommunications company) has established a roaming agreement with the operator of the roaming network (e.g., a second telecommunications company). Further, the roaming network may be an LTE network that uses VoLTE to provide voice services while the home network may not use VoLTE (e.g., the home network may provide circuit-switched voice connectivity).

Consistent with concepts described herein, the roaming mobile device may be enabled to use VoLTE voice services while attached to the roaming network. In one implementation, and as shown in FIG. 1, the roaming mobile device may receive a VoLTE client application ("VoLTE App"), such as an application that is downloaded from an application server associated with the roaming network. The VoLTE client application may provide functionality, to the mobile device, that may normally be provided as part of the core communication functionality of a mobile device that is designed to operate with the roaming network (e.g., a mobile device that uses the roaming network as its home network).

A VoLTE enabled mobile device may have a number of advantages relative to circuit switched voice technologies, such as higher fidelity voice calls, the ability to perform file transfers, the ability to use instant messaging services, and the ability to transmit presence information to the network. Advantageously, as described herein, a roaming mobile device may take advantage of these features of VoLTE even when the home network of the mobile device does not implement VoLTE.

Figure 2:
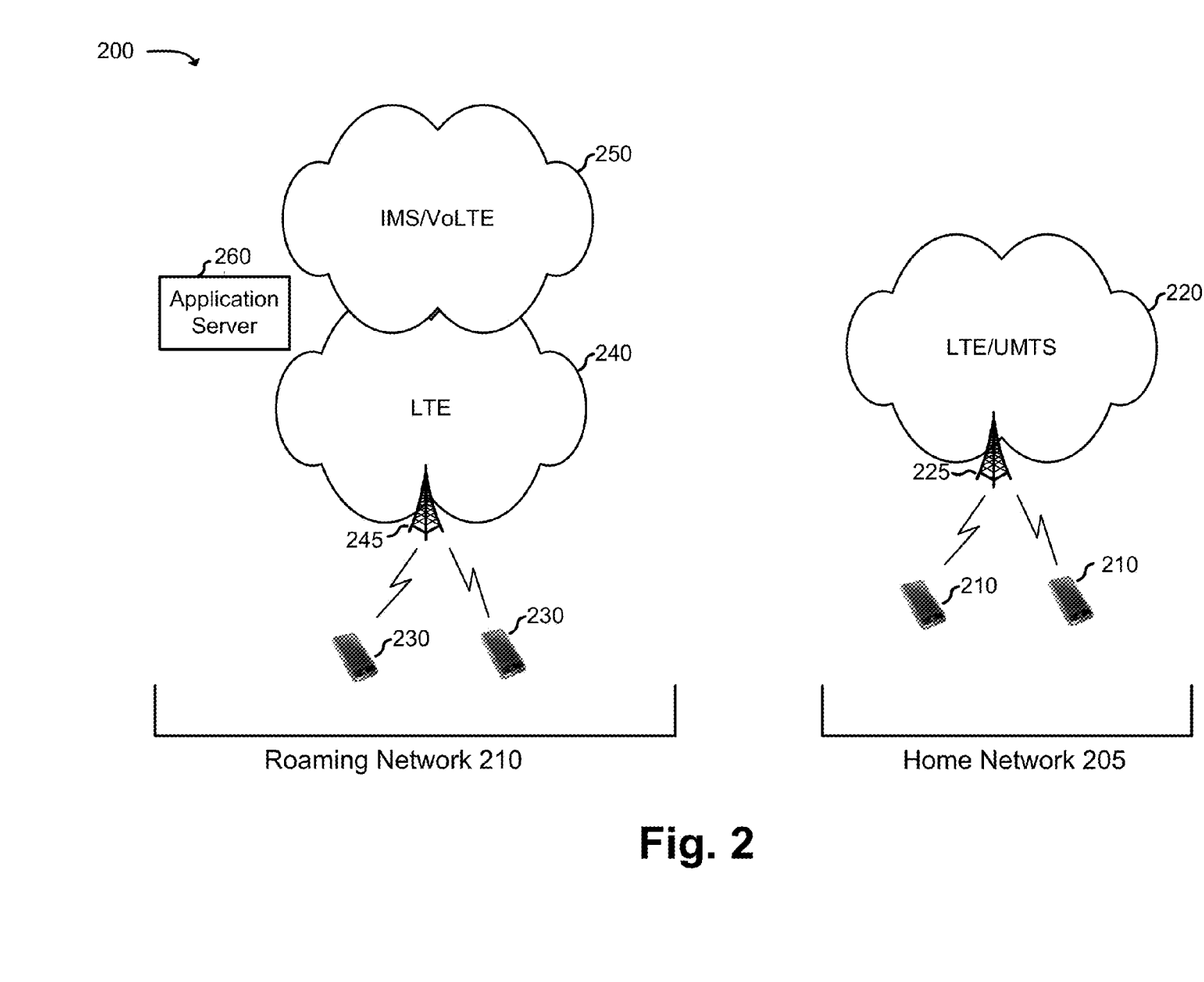
FIG. 2 is a diagram of an example environment in which systems and/or methods described herein may be implemented.

FIG. 2 is a diagram of an example environment 200 in which systems and/or methods described herein may be implemented. As illustrated, environment 200 may include at least two telecommunications networks: home network 205 and roaming network 210. Home network 205 and roaming network 210 may, for example, each be associated with a different wireless telecommunications provider. The different wireless telecommunications providers may have established roaming agreements between one another, so that a mobile device ("user equipment" or "UE") from one of the networks may obtain wireless network connectivity when the UE is in a geographical area associated with the other of the networks (e.g., within range of a base station associated with the other network). A roaming agreement may generally refer to an agreement, between telecommunications providers, to provide service to customers of the other telecommunication provider.

Home network 205 may provide wireless network service to one or more UEs 210. Home network 205 may include, for example, a network based on the Long Term Evolution (LTE) network 220. Voice calls through network 220 may be handled using a circuit-switched technology, such as UMTS. LTE/UMTS network 220, as illustrated, may include one or more base stations 225, which, in the context of an LTE network, may be referred to as an Evolved Node B (eNodeB). In alternative implementation, LTE/UMTS network 220 may implement voice calls using technologies other than through UMTS.

Roaming network 210 may provide wireless network service to one or more UEs 230. Roaming network 210 may include, for example, a network based on the LTE standard, illustrated as LTE network 240. LTE network 240, as illustrated, may include one or more base stations (e.g., eNodeBs) 245.

LTE network 240 may use VoLTE to handle voice calls and/or to provide other services. VoLTE may be based on the IP Multimedia Subsystem (IMS) network standard. In general, IMS refers to an architecture designed to provide mobile and fixed multimedia services. IMS may use a standardized implementation of Session Initiation Protocol (SIP) and may run over IP networks. The devices and functionality that provide IMS/VoLTE, for LTE network 240, are illustrated in FIG. 2 as IMS/VoLTE network 250.

An application server 260 is additionally shown in FIG. 2. Application server 260 may provide services to UEs 230, such as services relating to the addition of additional functionality to UEs 230. In some implementations, application server 260 may provide updates to UEs 230, which may include providing software that allows UEs 230 to provide VoLTE services. For example, a VoLTE client application may be pushed to UEs 230 through an over the top (OTT) transmission, or the VoLTE client application to be downloaded to UEs 230 using other technologies. In some implementations, a user of UE 230 may be notified, such as via a text message, to the downloading and installation of the VoLTE client application before the VoLTE client application is installed.

UEs 210/230 may include portable computing and communication devices, such as a personal digital assistant (PDA), a smart phone, a cellular phone, a laptop computer with connectivity to a cellular wireless network, a tablet computer, etc. UEs 210/230 may also include non-portable computing devices, such as desktop computers, consumer or business appliances, set-top devices (STDs), or other devices that have the ability to connect to a wireless network. UEs 210/230 may connect, through a radio link, to base stations 225/245. Through the radio link, UEs 210/230 may obtain data and/or voice services.

Each base station 225/245 may provide radio interfaces over which the base station may communicate with UEs 210/230. The radio interfaces provided by base stations 225/245 may include, for example, orthogonal frequency-division multiplexing (OFDM) and/or single-carrier frequency-division multiple access (SC-FDMA) based radio interfaces.

Figure 3:
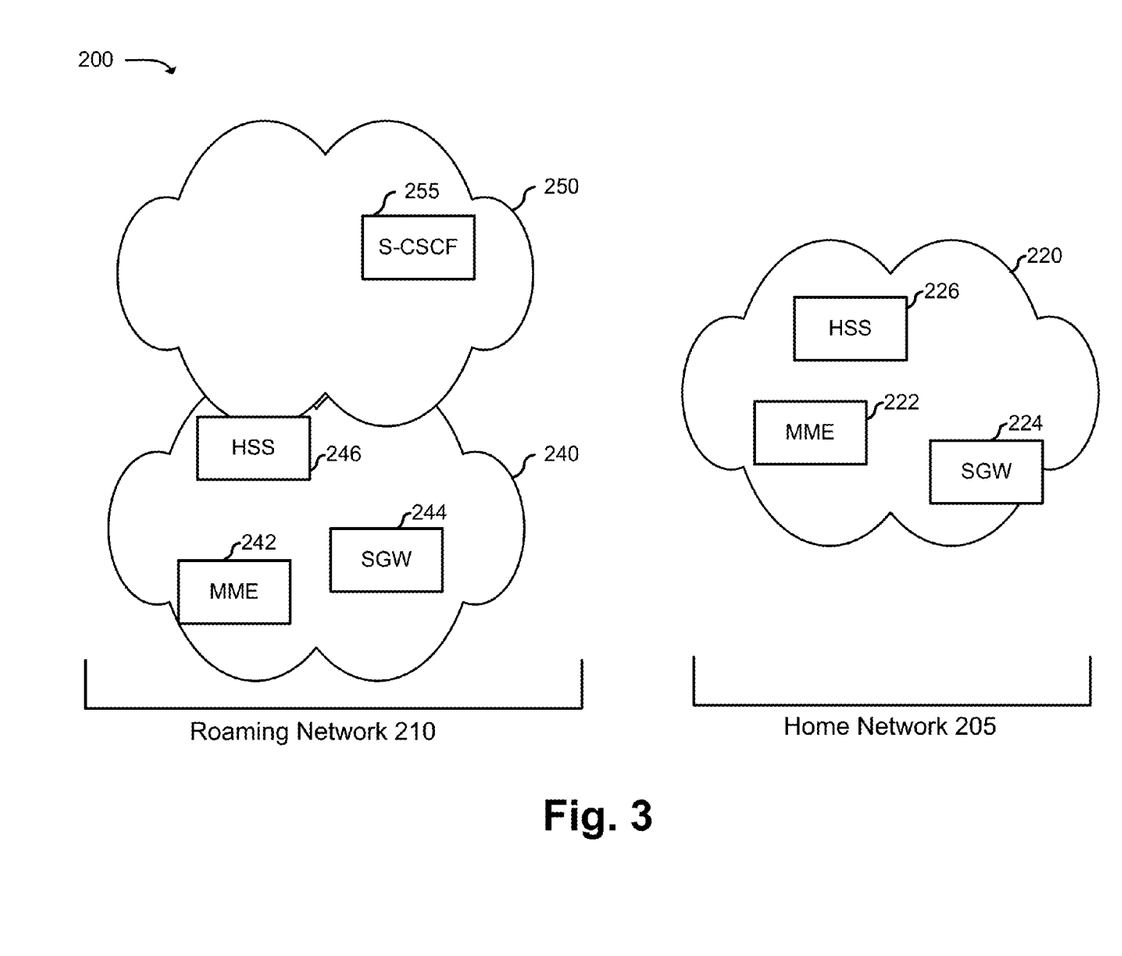
FIG. 3 is a diagram that illustrates a more detailed view of portions of the example environment shown in FIG. 2.

FIG. 3 is a diagram that illustrates a more detailed view of portions of example environment 200. In particular, certain elements of LTE/UMTS network 220, LTE network 240, and IMS/VoLTE network 250 are illustrated in additional detail.

As illustrated, LTE/UMTS network 220 may include one or more computation and communication devices that perform signaling for home network 205, including Mobility Management Entity (MME) 222, serving gateway (SGW) 224, and home subscriber server (HSS) 226. MME 235 may, for example, include one or more computation and communication devices that are responsible for authenticating UEs, maintaining location information for UEs, and selecting a packet gateway to service a particular UE (such as a gateway to another network). SGW 224 may include one or more computation and communication devices that route and forward user data packets. SGW 224 may also act as a mobility anchor during inter-base station handoffs. HSS 226 may include one or more computation and communication devices that act as a central database to maintain user-related and subscription-related information. HSS 226 may implement functionality relating to mobility management, call and session establishment support, user authentication, and access authorization.

LTE network 240 may include one or more computation and communication devices that perform signaling for roaming network 210, including MME 242, SGW 244, and HSS 246. MME 242, SGW 244, and HSS 246 may include functionality similar to that of MME 222, SGW 224, and HSS 226, respectively.

IMS/VoLTE network 250 may include one or more computation and communication devices that implement IMS/VoLTE functionality within the context of LTE network 240. As illustrated, IMS/VoLTE network 250 may include, for example, a serving Call Session Control Function (S-CSCF) 255. S-CSCF 255 may act as a SIP server and may also perform session control functions. S-CSCF 255 may determine the particular application servers to handle particular service requests and enforce network policy. S-CSCF 255 may implement interfaces to HSS 246, from which S-CSCF 255 may download subscriber profile information.

Although FIGS. 2 and 3 illustrate example components of environment 200, in other implementations, environment 200 may contain fewer components, different components, differently arranged components, or additional components than those depicted in environment 200. Alternatively, or additionally, one or more components of environment 200 may perform one or more other tasks described as being performed by one or more other components of environment 200.

Figure 4:
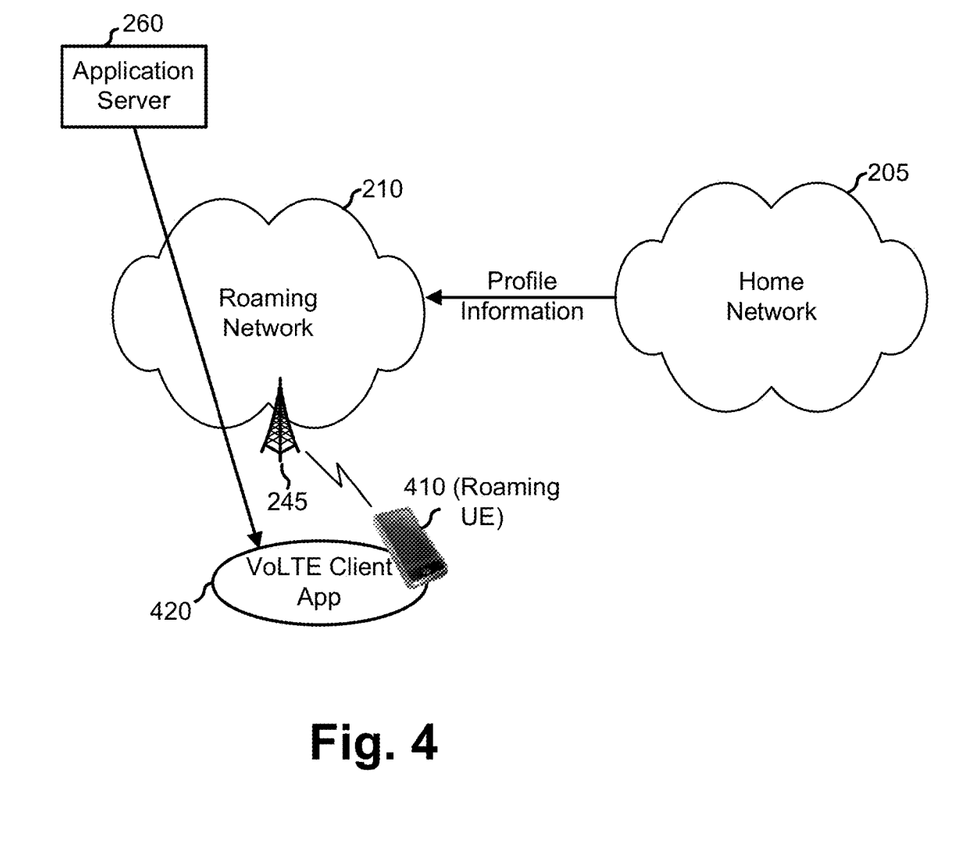
FIG. 4 is a diagram conceptually illustrating operation of components of the environment shown in FIG. 2.

FIG. 4 is a diagram conceptually illustrating operation of components of environment 200. As illustrated in FIG. 4, assume that UE 410, which may correspond to UE 210 or UE 230, is a UE that is registered for wireless service from home network 205. Further assume that the user of UE 410 has moved UE 410 to a geographical area that is not served by home network 205, but is served by roaming network 210. Providers associated with roaming network 210 and home network 205 may have an established roaming agreement.

During the attachment process to roaming network 210, such as through base station 245, roaming network 210 may determine that UE 410 does not include VoLTE capabilities. For example, roaming network 210 may obtain profile information, from home network 205, that describes the capabilities of UE 410. The profile information may indicate that home network 205 does not support VoLTE. Based on this profile information, roaming network 210 may determine that UE 410 may also not include support for VoLTE. Alternatively or additionally, the fact that UE 410 does not include support for VoLTE may be determined based on information obtained from other sources, such as directly from UE 410.

Application server 260 may push or otherwise transmit VoLTE client application 420 ("VoLTE client app") to UE 410. VoLTE client application 420 may enable UE 410 to use VoLTE services, such as placing a VoLTE-implemented telephone call, through roaming network 210. In some implementations, VoLTE client application 420 may enable features and/or services in addition to voice calls, such as services provided by the Rich Communication Services (RCS) suite. The services may include, for example, instant messaging, chat, live video sharing, video telephony, and file transfer.

Figure 5:
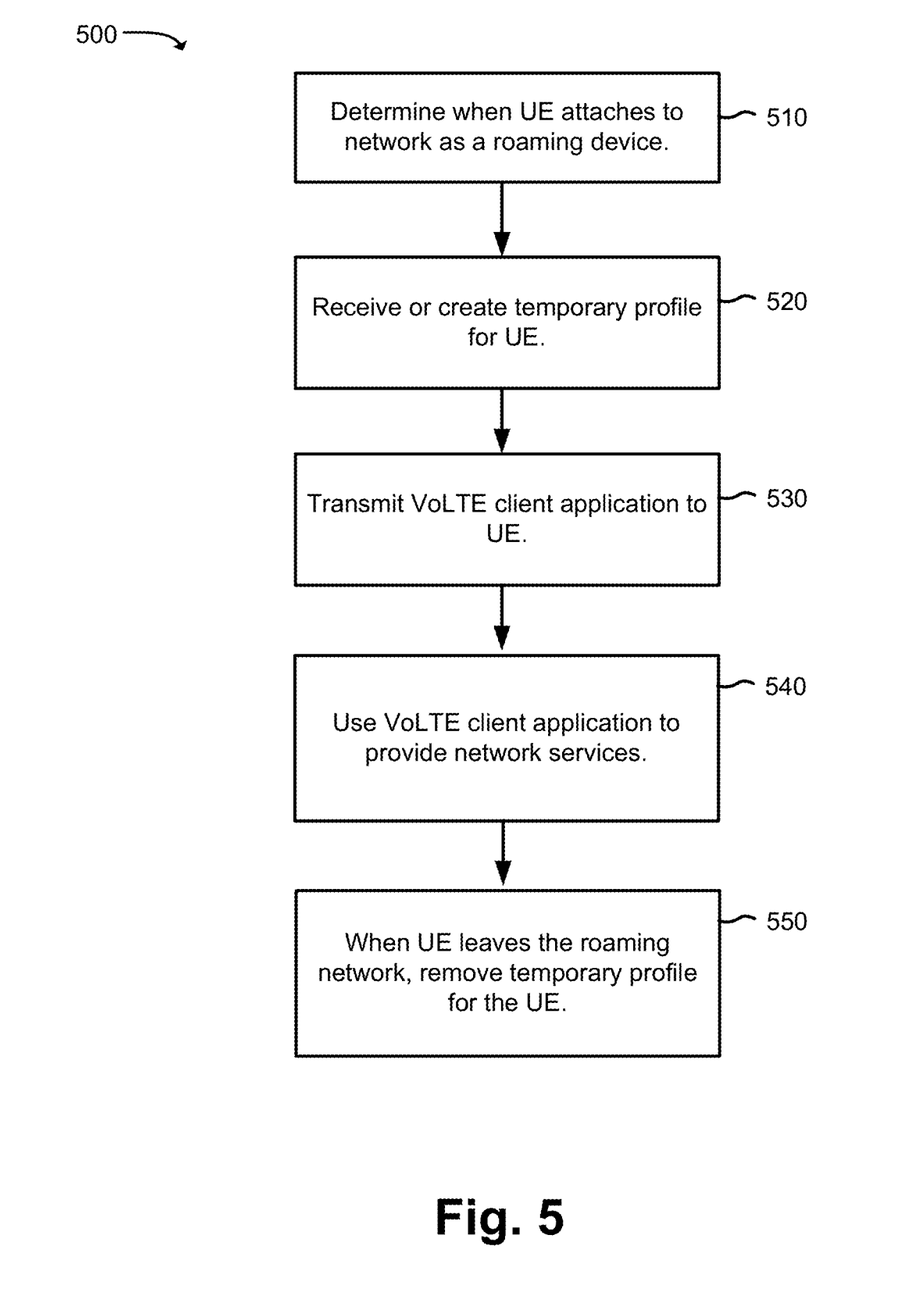
FIG. 5 is a flow chart illustrating an example process for providing VoLTE services to a device.

FIG. 5 is a flow chart illustrating an example process 500 for providing VoLTE services to a device, such as to a roaming UE. Process 500 may be implemented, for example, by one or more of the devices in LTE network 240 and/or IMS/VoLTE network 250, such as MME 242, SGW 244, HSS 246, and/or S-CSCF 255.

Assume that UE 410, associated with a particular home network 205, is taken to a geographical location in which the UE no longer has connectivity to home network 205. The UE may, however, be able to connect to a roaming network 210.

Process 500 may include determining that a UE attaches to a network as a roaming device (block 510). Attaching to a roaming network may include UE 410 wirelessly communicating, through base station 245, to LTE network 240 (e.g., a network that may be considered to be a roaming network, with respect to UE 410). For LTE network 240 to accept the connection to the roaming UE 410, home network 205 and roaming network 210 may have previously agreed upon a roaming agreement. The roaming agreement may specify, for example, billing terms and/or other terms relating to the usage of roaming network 210 by visiting UE 410.

Process 500 may further include creating or receiving a temporary profile for the UE (block 520). In one implementation, the roaming agreement between home network 205 and roaming network 210 may provide for the exchange of profile information. For example, roaming network 210, such as through MME 242 or another device, may request profile information for UE 410 from HSS 226, in home network 205. Alternatively or additionally, a profile may be created for UEs 410 based on information received from UE 410 as part of the attachment of the UE to roaming network 210. The profile may include, for example, information identifying the UE, information relating to the capabilities of the UE, and/or information relating to services subscribed to or available to the UE.

Process 500 may further include transmitting a VoLTE client application to the UE (block 530). For example, VoLTE client application 420 may be pushed, or otherwise downloaded, from application server 260. UE 410 may subsequently install the VoLTE client application 420.

Figure 6:
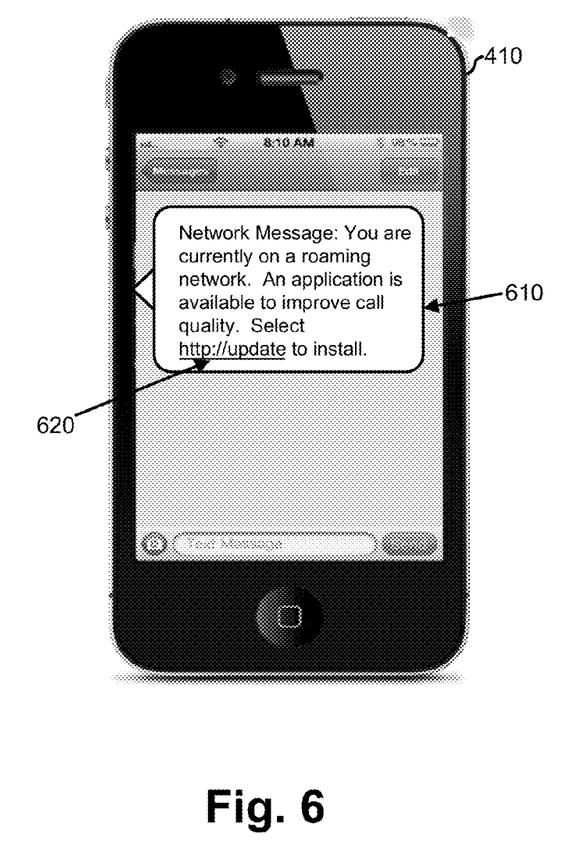
FIG. 6 is a diagram of an example interface that may be presented to a user of a device.

In some implementations, a text message or other message may be sent to UE 410 to inform the user, and/or to obtain permission from the user, to download and install VoLTE client application 420. FIG. 6 is a diagram of an example interface that may be presented to a user of UE 410 to ask permission to install VoLTE client application 420. As illustrated, a message, such as a Short Message Service (SMS) text message 610, may be sent to UE 410. Text message 610 may be sent, for example, in response to UE 410 initially attaching to roaming network 210. Text message 610 may inform the user that UE 410 is obtaining network service from a roaming network and that an application is available to improve the network experience. As illustrated, message 610 states: "You are currently on a roaming network. An application is available to improve call quality." In this example, user may be affirmatively required to select an option, such as link 620, to initiate installation of VoLTE client application 420. In some implementations, the user may also be presented with a fee structure associated with the use of UE 410 while roaming and/or user may be required to agree to an end-user license agreement (EULA) before downloading VoLTE client application 420.

In some implementations, instead of notifying the user of the availability of VoLTE client application 420, client application 420 may be automatically installed at UE 410 (e.g., without notifying and/or prompting the user). In general, a number of techniques, including automatic "push" based downloading techniques and techniques in which the user has a more active role in the installation of VoLTE client application 420, may potentially be used to download and install VoLTE client application 420 to UE 410.

A user of UE 410, at which VoLTE client application 420 is installed, may wish to use a VoLTE and/or RCS based network service, such as voice, instant messaging, chat, live video sharing, video telephony, and/or file transfer. Process 500 may include using the VoLTE client application to provide network services (block 540). For example, one or more devices, in IMS/VoLTE network 250, may interact with VoLTE client application 420 to provide the VoLTE and/or RCS based network services. For example, VoLTE client application 420 may implement one or more codecs and/or protocols needed to provide VoLTE based voice services (e.g., telephone calls), such as a VoLTE quality of service (QoS) codec. The temporary profile created for UE 410 may be used in providing the VoLTE and/or RCS based network services.

Figure 7:
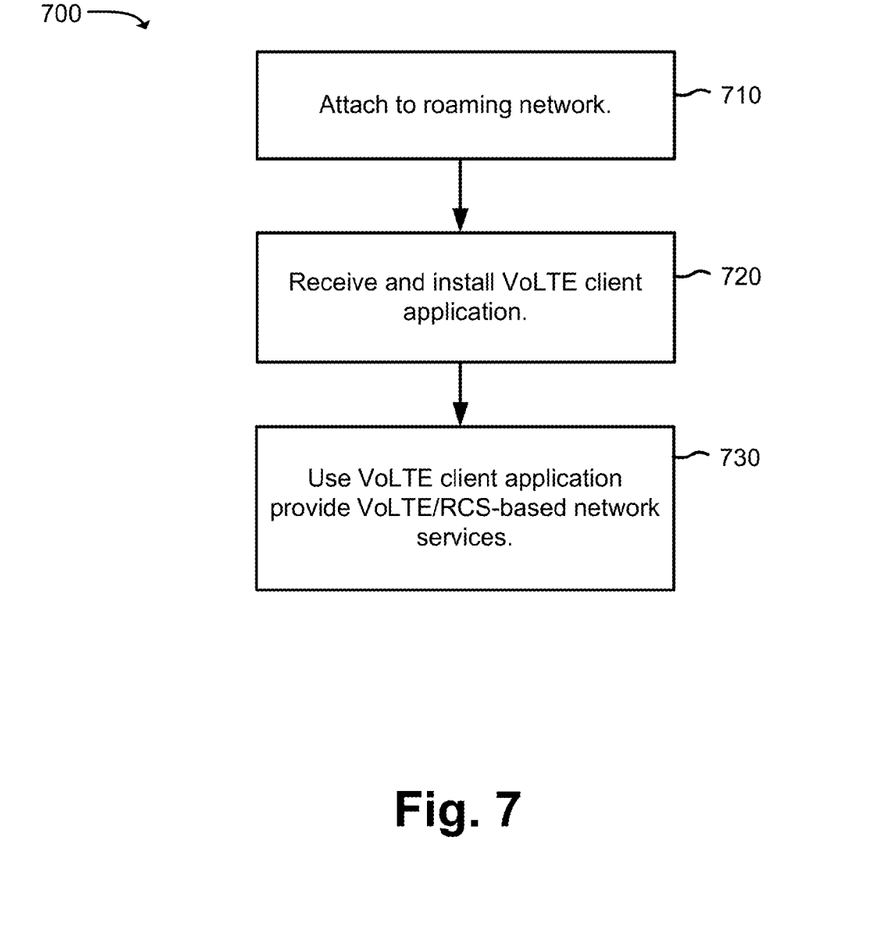
FIG. 7 is a flow chart illustrating an example process for providing VoLTE services at a mobile device.

At some point, UE 410 may no longer be associated with roaming network 210. For example, the user of UE 410 may return to the geographic area associated with home network 205. Process 500 may further include removing the temporary profile for UE 410 (block 550). In one implementation, the temporary profile may be removed based on a certain period of inactivity. For example, a temporary profile may be deleted when the corresponding UE 410 has not connected to roaming network 210 for a certain time period (e.g., two days). In some implementations, VoLTE client application 420 may be uninstalled when UE 410 is no longer associated with roaming network 210. Alternatively, when UE 410 returns to home network 205, VoLTE client application 420 may not run or may otherwise not provide functionality in the context of home network 205. FIG. 7 is a flow chart illustrating an example process 700 for providing VoLTE services at a UE. Process 700 may be implemented, for example, by UE 410.

Process 700 may include attaching to the roaming network (block 710). For example, UE 410 may attach to roaming network 210. The home network of UE 410 may be a network that has a roaming agreement with roaming network 210. Additionally, the home network may include a network in which IMS/VoLTE services are not supported.

Process 700 may further include receiving, from the roaming network, and installing a VoLTE client application (block 720). As previously mentioned, one or more devices in roaming network 210 may push or otherwise download VoLTE client application 420.

Process 700 may further include using the downloaded VoLTE client application to provide VoLTE and/or RCS based network services (block 730). For example, one or more devices, in IMS/VoLTE network 250, may interact with VoLTE client application 420 to provide the VoLTE and/or RCS based network services.

Figure 8:
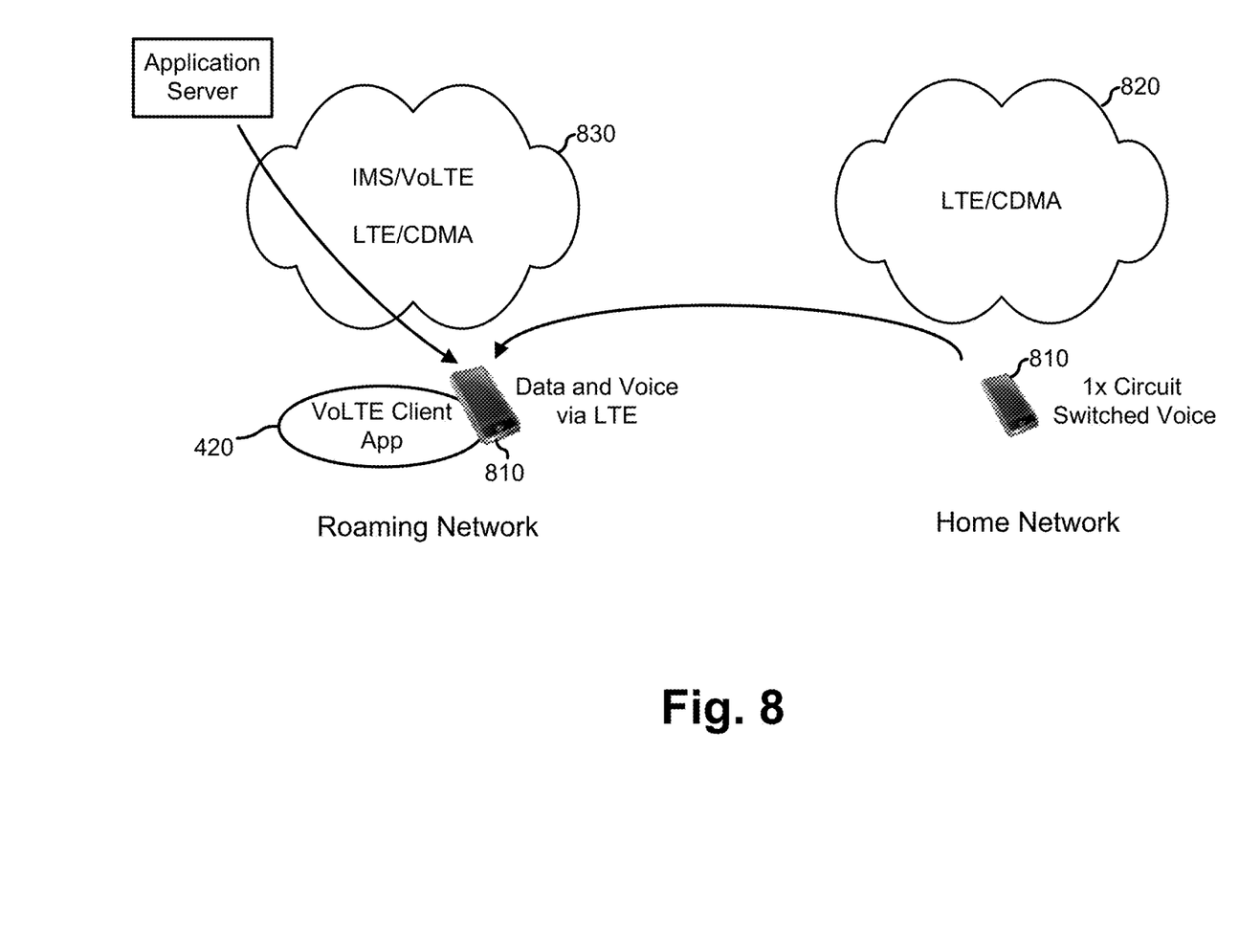
FIG. 8 is a diagram conceptually illustrating an example of environment, according to another possible implementation.

FIG. 8 is a diagram conceptually illustrating an example of an environment, according to another possible implementation, in which VoLTE client application 420 may be used to provide services to a roaming UE.

In FIG. 8, a UE 810 may be associated with a home network that includes an LTE/CDMA (code division multiple access) network 820. LTE/CDMA network 820 may provide data to its users via LTE while connecting telephone calls via circuit-switched voice (e.g., via CDMA). UE 810 may roam to another network, such as network 830, which may include a LTE/CDMA network that also implements VoLTE and IMS. Network 830 may thus be able to provide both voice and data using packetized data streams.

Assume that providers associated with network 820 and network 830 have an established roaming agreement. When UE 810 roams to network 830, UE 810, when initially connecting to network 830, may be able to use circuit-switched voice connections and LTE data connections. To enhance the capabilities of UE 810, VoLTE client application 420 may be pushed or otherwise downloaded to UE 810. Other information, such as the mobile device number (MDN), or other information relating to UE 810, may also be pushed or otherwise downloaded to UE 810. After installation at UE 810, VoLTE client application 420 may increase the functionality of UE 810 to operate with the IMS/VoLTE features of network 830. UE 810 may, for example, use VoLTE client application 420 to interact with the IMS/VoLTE functionality of network 830 to give UE 810 VoLTE/RCS features (e.g., voice over LTE, instant messaging, chat, live video sharing, and file transfer).

In the implementations described above, VoLTE client application 420 is described as interacting with IMS/VoLTE network devices to provide services, such as voice services, that are implemented by the IMS/VoLTE network. In some implementations, however, VoLTE client application 420 may alternatively or additionally be capable of providing voice, and/or other services, such as services provided through an over the top (OTT) data connection.

Figure 9:
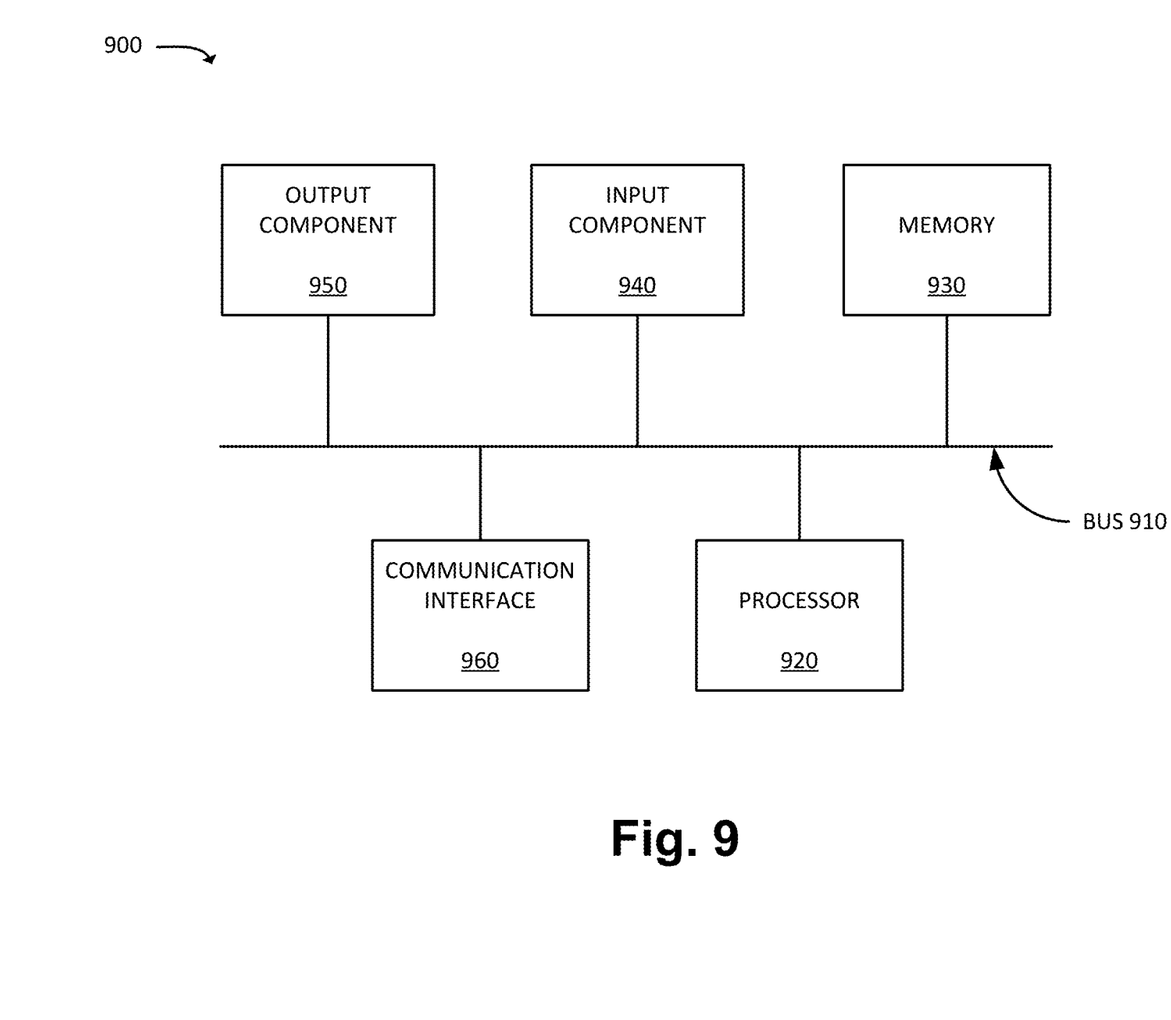
FIG. 9 is a diagram of example components of a device.

FIG. 9 is a diagram of example components of a device 900. Each of the devices illustrated in FIGS. 1-4 and 7 may include one or more devices 900. Device 900 may include bus 910, processor 920, memory 930, input component 940, output component 950, and communication interface 960. In another implementation, device 900 may include additional, fewer, different, or differently arranged components. Some non-limiting examples of device 900, with additional and/or different components, are discussed below.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   determining, by one or more devices associated with a network and based on a mobile device attaching to the network as a roaming device for the network, a home network of the mobile device, the network and the home network being associated with different telecommunication providers that have established a roaming agreement with one another, and the mobile device operating as the roaming device when the mobile device is in a geographic area that is not covered by the home network of the mobile device;

determining, by the one or more devices, whether the home network, associated with the mobile device, provides Voice over Long Term Evolution (VoLTE) services;

creating, by the one or more devices, a temporary profile for the mobile device in the network;

transmitting, by the one or more devices, based on the determination that the home network does not provide VoLTE services and based on the temporary profile, a VoLTE client application to the mobile device, the VoLTE client application enabling, for the mobile device, usage of VoLTE services in the network;

communicating, by the one or more devices, with the mobile device and the VoLTE client application, to provide one or more VoLTE services to the mobile device; and deleting the temporary profile, associated with the mobile device, after the mobile device leaves the network.

2. The method of claim 1, wherein the provided one or more VoLTE services include voice calls.

3. The method of claim 1, wherein the provided one or more VoLTE services include at least two of voice calls, instant messaging, chat, live video sharing, and file transfer.

4. The method of claim 1, wherein the network includes a Long Term Evolution (LTE) network.

5. The method of claim 1, further comprising:
receiving profile data, associated with the mobile device, from the home network; and
using the profile data to create the temporary profile and to provide the one or more VoLTE services to the mobile device.

6. The method of claim 1, further comprising:
transmitting a message, to the mobile device and in response to the determination that the home network does not provide VoLTE services and in response to the attachment of the mobile device to the network, informing a user of the mobile device that an application is available to enhance services of the network;
receiving, in response to the message, an indication of whether the user consents to installation of the VoLTE client application; and
installing the VoLTE client application when the user consents to install the VoLTE client application.

7. The method of claim 6, wherein the message includes a short message service (SMS) text message.

8. The method of claim 1, further comprising:
causing uninstallation of the VoLTE client application after the mobile device leaves the network.

9. A device comprising:
a memory; and
at least one processor to execute instructions in the memory to:
determine, based on a mobile device attaching to a network as a roaming device for the network, a home network of the mobile device, the network and the home network being associated with different telecommunication providers that have established a roaming agreement with one another, and the mobile device operating as the roaming device when the mobile device is in a geographic area that is not covered by the home network of the mobile device;
determine whether the home network, associated with the mobile device, provides Voice over Long Term Evolution (VoLTE) services;
create a temporary profile for the mobile device in the network;
transmit, based on the determination that the home network does not provide VoLTE services and based on the temporary profile, a VoLTE client application to the mobile device, the VoLTE client application enabling, for the mobile device, usage of VoLTE services in the network;
communicate with the mobile device and the VoLTE client application, to provide one or more VoLTE services to the mobile device; and
delete the temporary profile, associated with the mobile device, after the mobile device leaves the network.

10. The device of claim 9, wherein the provided one or more VoLTE services include voice calls.

11. The device of claim 9, wherein the network includes a Long Term Evolution (LTE) network.

12. The device of claim 9, wherein the at least one processor is to additionally execute instructions in the memory to:
receive profile data, associated with the mobile device, from the home network; and
use the profile data to provide the one or more VoLTE services to the mobile device.

13. The device of claim 9, wherein the at least one processor is to additionally execute instructions in the memory to:
transmit a message, to the mobile device and in response to the determination that the home network does not provide VoLTE services and in response to the attachment of the mobile device to the network, informing a user of the mobile device that an application is available to enhance services of the network;
receive, in response to the message, an indication of whether the user consents to installation of the VoLTE client application; and
install the VoLTE client application when the user consents to install the VoLTE client application.

14. The device of claim 9, wherein the message includes a short message service (SMS) text message.

15. The device of claim 9, wherein the at least one processor is to additionally execute instructions in the memory to:
cause uninstallation of the VoLTE client application after the mobile device leaves the network.

16. A non-transitory computer-readable medium, comprising:
a plurality of computer-executable instructions, which, when executed by one or more processors, cause the one or more processors to:
determine, based on a mobile device attaching to a network as a roaming device for the network, a home network of the mobile device, the network and the home network being associated with different telecommunication providers that have established a roaming agreement with one another, and the mobile device operating as the roaming device when the mobile device is in a geographic area that is not covered by the home network of the mobile device;
determine whether the home network, associated with the mobile device, provides Voice over Long Term Evolution (VoLTE) services;

create a temporary profile for the mobile device in the network;

transmit, based on the determination that the home network does not provide VoLTE services and based on the temporary profile, a VoLTE client application to the mobile device, the VoLTE client application enabling, for the mobile device, usage of VoLTE services in the network;

communicate with the mobile device and the VoLTE client application, to provide one or more VoLTE services to the mobile device and delete the temporary profile, associated with the mobile device, after the mobile device leaves the network.

17. The non-transitory computer-readable medium of claim 16, wherein the provided one or more VoLTE services include at least two of voice calls, instant messaging, chat, live video sharing, and file transfer.

18. The non-transitory computer-readable medium of claim 16, wherein the plurality of computer-executable instructions, which, when executed by one or more processors, additionally cause the one or more processors to:

receive profile data, associated with the mobile device, from the home network; and use the profile data to create the temporary profile and to provide the one or more VoLTE services to the mobile device.

19. The non-transitory computer-readable medium of claim 16, wherein the plurality of computer-executable instructions, which, when executed by one or more processors, additionally cause the one or more processors to:

cause uninstallation of the VoLTE client application after the mobile device leaves the network.

20. The non-transitory computer-readable medium of claim 16, wherein the plurality of computer-executable instructions, which, when executed by one or more processors, additionally cause the one or more processors to:

transmit a message, to the mobile device and in response to the determination that the home network does not provide VoLTE services and in response to the attachment of the mobile device to the network, informing a user of the mobile device that an application is available to enhance services of the network;

receive, in response to the message, an indication of whether the user consents to installation of the VoLTE client application; and install the VoLTE client application when the user consents to install the VoLTE client application.

\* \* \* \* \*